United States Patent
Brillenburg Wurth

[11] 3,793,666
[45] Feb. 26, 1974

[54] WINDSCREEN WASHER

[76] Inventor: Anthony Brillenburg Wurth, Teckerstraat 12, 3052 Ottenburg, Belgium

[22] Filed: Dec. 23, 1971

[21] Appl. No.: 211,583

[52] U.S. Cl............ 15/250.04, 15/250.2, 15/250.35
[51] Int. Cl. .............................................. B60s 1/52
[58] Field of Search 15/250, 250.01, 250.03, 250.04, 15/250.35, 250.42, 250.22, 205.2; 239/284

[56] References Cited
UNITED STATES PATENTS

| | | | |
|---|---|---|---|
| 2,799,887 | 7/1957 | Nemic............................... | 15/250 X |
| 3,008,170 | 11/1961 | Marks............................... | 15/250.04 |
| 3,213,493 | 10/1965 | Chichester....................... | 239/284 X |
| 3,296,647 | 1/1967 | Gumbleton...................... | 15/250.04 |
| 3,428,992 | 2/1969 | Giorgio............................ | 15/250.04 |

FOREIGN PATENTS OR APPLICATIONS

| 16,651 | 8/1956 | Germany.......................... | 15/250.04 |
|---|---|---|---|

Primary Examiner—P. Feldman
Attorney, Agent, or Firm—Hammond & Littell

[57] ABSTRACT

The windscreen washer comprises a deflector protecting, against the vehicle slipstream, liquid nozzles with which it is provided. The turbulence effect set up in the vicinity of the nozzles deflects the liquid towards the windscreen. The deflector is advantageously fast with the arm of the windscreen wiper.

5 Claims, 10 Drawing Figures

PATENTED FEB 26 1974

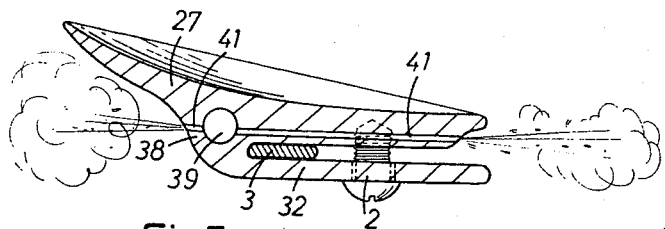
Fig.7. Fig.5.
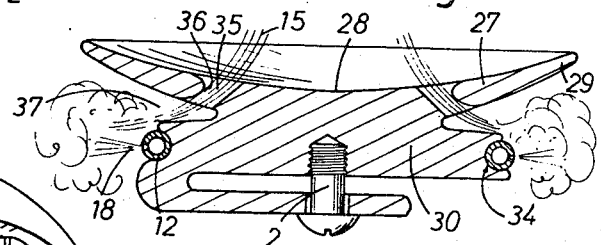
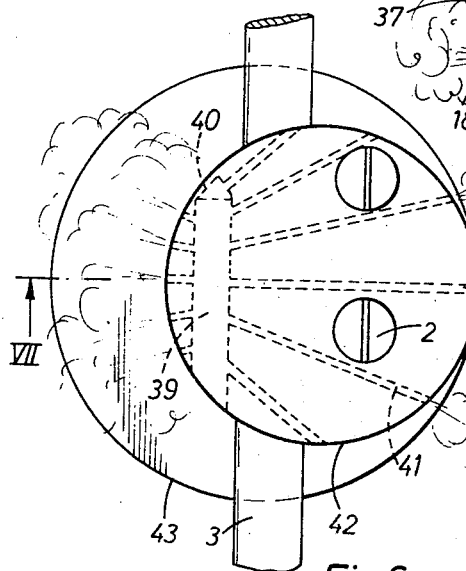
Fig.6.
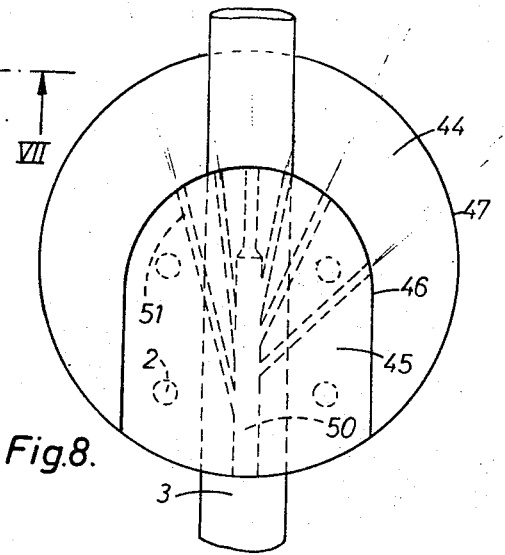
Fig.8.
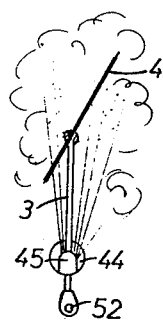
Fig.10.
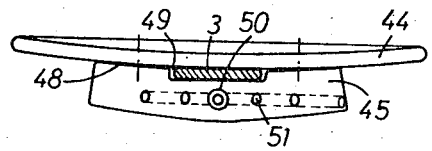
Fig.9.

WINDSCREEN WASHER

The invention relates to a washer for a vehicle windscreen.

It is known that it is difficult to prevent the cleaning liquid projected on to the windscreen from being carried away by the wind, above all when the vehicle is travelling at high speed. In some cases, it may even happen that the blade of the windscreen wiper rubs over the dry glass and that it is necessary to sprinkle the glass during the entire cleaning period; this involves a risk that visibility may be impaired and that an accident may result.

The windscreen washer according to the invention makes it possible to obviate this serious disadvantage and to effect washing with maximum efficacy.

It comprises, on the arm of the washer, a deflector protecting against the vehicle slipstream liquid nozzles with which it is provided, in such manner that the liquid projected out of the deflector through the said nozzles is spread over the windscreen due to the wind pressure, on the two sides of the blade.

The nozzles are advantageously disposed in annular arrangement within the contour of the deflector; in particular, the annular arrangement of the nozzles and the contour of the deflector may be circular and eccentric relative to each other.

The deflector is so shaped that it sets up, in the vicinity of the nozzles, a turbulence effect adapted to deflect the projected liquid towards the windscreen. In particular, it may be perforated with orifices oriented in such manner that the wind travelling through them carries the liquid towards the windscreen on both sides of the blade.

Advantageously, the deflector is fast with the arm of the windscreen wiper.

A plurality of embodiments of the invention is shown by way of example in the accompanying drawings.

FIG. 5 is a view in section of a fourth embodiment;

FIG. 6 is a view in elevation of a fifth embodiment;

FIG. 7 is a view in section of FIG. 6 taken along the line VII—VII;

FIG. 8 is an elevational view of a sixth embodiment;

FIG. 9 is a section of FIG. 8, and

FIG. 10 shows the windscreen washer of FIG. 8 mounted on the arm of a windscreen wiper, near the axis of rotation.

Figure 1:
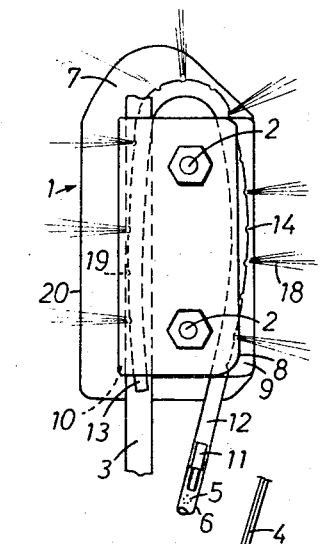
FIG. 1 is an elevational view of a first embodiment of the invention.
Figure 2:
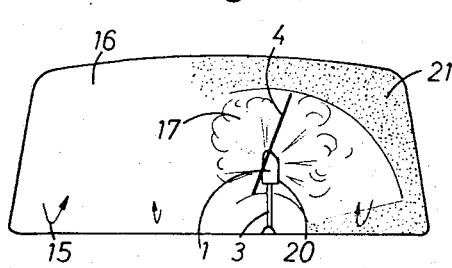
FIG. 2 is a view of the windscreen washer of FIG. 1, mounted on the windscreen of a vehicle.

According to a first embodiment of the invention, the vehicle windscreen washer comprises a deflector 1 (FIGS. 1 and 2) which is secured by two screws 2 on the arm 3 of the windscreen wiper and partially covers the blade 4. It is fed with cleansing liquid 5 supplied from a reservoir (not shown) through a conduit 6 advantageously concealed by the arm. It is constituted by a thin transparent and flexible plate, folded twice in such manner as to afford the deflecting plate 7 proper and two portions 8 and 9 which are smaller, so that they are entirely covered by the deflecting plate proper. The deflector is secured on the arm 3 by inserting the latter into the recess 10 formed by folding between the plate 7 and the portion 8. The conduit 6 is connected by a connector 11 to a flexible hose 12 closed at one end 13 and perforated on one side with a series of small orifices 14. The hose 12 is clamped about screws, the end 13 being disposed between the plate 7 and the portion 8 in such manner that the hose forms a loop the outer side of which is formed with the orifices, and that a large number of orifices is covered by the deflecting plate.

In order to wash the windscreen during travel in dry weather, the windscreen wiper is operated, liquid meanwhile being supplied to the deflector. The liquid is projected out of orifices in all directions and the vehicle slip stream (15, FIG. 2), deflected by the deflecting plate 7, produces between the plate and the windscreen 16 turbulence eddies 17 which carry the jets 18 of liquid towards the windscreen within range of the blade and disintegrate them into fine droplets spread on the windscreen. In particular, jets emanating from orifices 19 which are further away than others from the edge 20 of the deflecting plate are required to travel along a longer travel path before being thus carried against the windscreen, so that the liquid may be spread over the windscreen in advance relative to the travel of the blade and the hardened mud 21 may be softened, thus facilitating washing.

Figure 3:
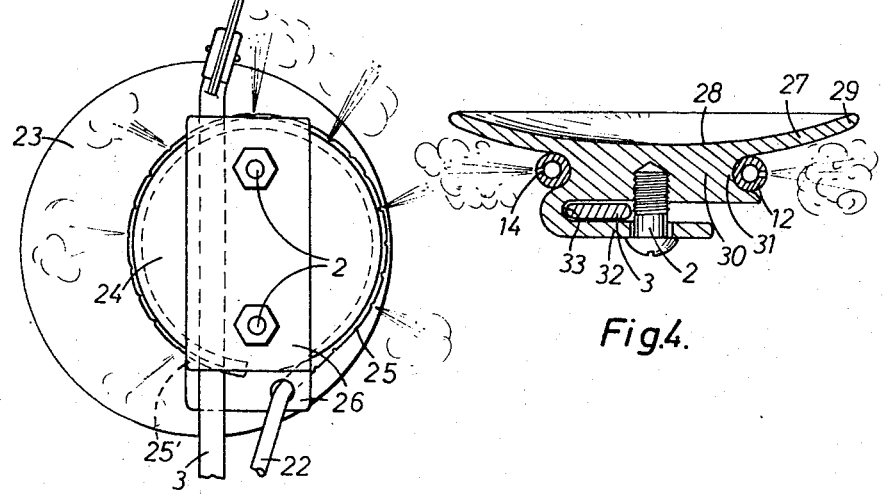
FIG. 3 is a view in elevation of a second embodiment.

According to a second embodiment analogous to the preceding one, the flexible hose 22 (FIG. 3) is gripped between the deflecting plate 23, which is circular, and a plate 24 parallel to it and within it, and which is also circular, the liquid nozzles 25 being disposed towards the exterior about the circumference of the plate 24. The shaft 3 is secured in the recess 25 formed by folding a plate 26 the two edges of which are secured together with the plates 24 and 23 by the screws 2.

Figure 4:
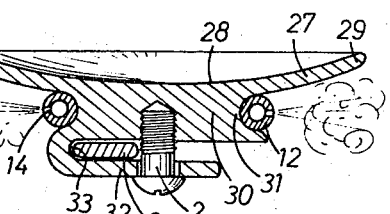
FIG. 4 is a view in section of a third embodiment.

According to a third embodiment, the deflecting plate 27 (FIG. 4) has a curved surface 28 curving inwardly. It is thin at the edge 29 and forms, with a base 30 with which it is fast, a constricted portion 31 adapted to receive the flexible hose 12 perforated on the external side with small orifices 14. The base 30 is prolonged by a plate 32 parallel to it and constitutes therewith a recess 33 adapted to receive the arm 3, the latter not being clamped by the screws 2.

According to a fourth embodiment, similar to the preceding one, the base 30 (FIG. 5) of the deflector comprises a groove 34 adapted to receive a flexible hose 12. The curved surface 28 is perforated at the level of the constriction 31, with a plurality of apertures 35 the wall of which comprises a constricted portion 36 in such manner that the wind 15 passing through them is accelerated at 37 and vigorously urges the jets 18 on to the windscreen 16.

According to a fifth embodiment of the invention, similar to the third one, the plate 32 (FIG. 6) is connected to the deflecting plate 27 by a constricted portion 38 perforated with a conduit 39 closed at one end 40 and adapted to be connected to the conduit 6. From the conduit 39 extend nozzles 41 disposed in angular arrangement 42 within the contour 43 of the deflecting plate, in such manner that the jets moisten the windscreen all around the blade.

According to a further embodiment of the invention, the deflecting plate 44 (FIGS. 8, 9 and 10) is a thin circular plate. The means 45 for distributing the liquid is also a plate, but the contour 46 thereof is smaller than the contour 47 of the plate 44. The surface 48 of the means 45 is advantageously curved inwardly and comprises a longitudinal gutter 49 adapted to receive the arm 3. The means 45 is axially perforated with an inner duct 50 adapted to be connected to the conduit 6, and it is provided with nozzles 51 oriented towards the upper portion of the contour 47 of the deflecting plate. The assembly is secured on the arm a small distance from the axis of rotation 52 thereof (FIG. 10) by screws, in such manner that the cleansing liquid 5 is projected towards the upper portion of the windscreen and very rapidly moistens all the zone over which the windscreen wiper brushes; furthermore, the presence of the deflector well below the field of vision of the driver does not inconvenience the latter.

According to a last embodiment (not shown) of the invention, the deflector is made of metal and is fast with the arm of the windscreen wiper.

Of course, the invention is not limited to the embodiments described and illustrated by way of example and the scope thereof would not be exceeded if modifications were to be made.

I claim:

1. A windscreen washer comprising a deflector, a conduit, and means for attaching the deflector and one end of said conduit to the arm of a windscreen wiper having a blade, the said one end of the conduit having nozzles located near the same face of the deflector on which said attaching means is located, the other end of said conduit being connectable to a source of cleansing liquid, and said deflector and said attaching means are shaped so that, in use, air flow over said deflector will produce turbulence in the vicinity of said nozzles, through which said liquid is discharged into the turbulent air flow to deflect the discharged liquid towards the windscreen on both sides of said wiper blade.

2. Windscreen washer according to claim 1, characterised in that the nozzles are disposed in annular arrangement within the contour of the deflector.

3. Windscreen washer according to claim 1, characterised in that the annular arrangement of nozzles and the contour of the deflector are circular and eccentric with respect to each other.

4. Windscreen washer according to claim 1, characterised in that the deflector is fast with the arm of the windscreen wiper.

5. A windscreen washer comprising a deflector, a conduit, and means for attaching the deflector and one end of said conduit to the arm of a windscreen wiper having a blade, the said end of the conduit having nozzles located near the same face of the deflector on which said attaching means is located, the other end of said conduit being connectable to a source of cleansing liquid, and said deflector and said attaching means are shaped so that, in use, air flow over said deflector will produce turbulence in the vicinity of said nozzles, through which said liquid is discharged into the turbulent air flow to deflect the discharged liquid towards the windscreen on both sides of said wiper blade, said deflector being perforated with orifices oriented in such a manner that said air flow passes through said orifices driving the liquid towards the windscreen on both sides of said wiper blade.

* * * * *

UNITED STATES PATENT OFFICE
CERTIFICATE OF CORRECTION

Patent No. 3,793,666   Dated   February 26, 1974

Inventor(s)   Anthony Brillenburg Wurth

It is certified that error appears in the above-identified patent and that said Letters Patent are hereby corrected as shown below:

Column 1, line 7, insert -- Claims priority, application Belgium, No. 97938 filed Dec. 23, 1970. --.

Signed and sealed this 1st day of October 1974.

(SEAL)
Attest:

McCOY M. GIBSON JR.
Attesting Officer

C. MARSHALL DANN
Commissioner of Patents